Nov. 8, 1966  F. C. ALBRIGHT  3,284,031

AIRPLANE LANDING GEAR WITH ENDLESS TRACK

Filed Sept. 30, 1964  2 Sheets-Sheet 1

INVENTOR.
FRANKLIN C. ALBRIGHT
BY
Richard G. Geib
ATTORNEY

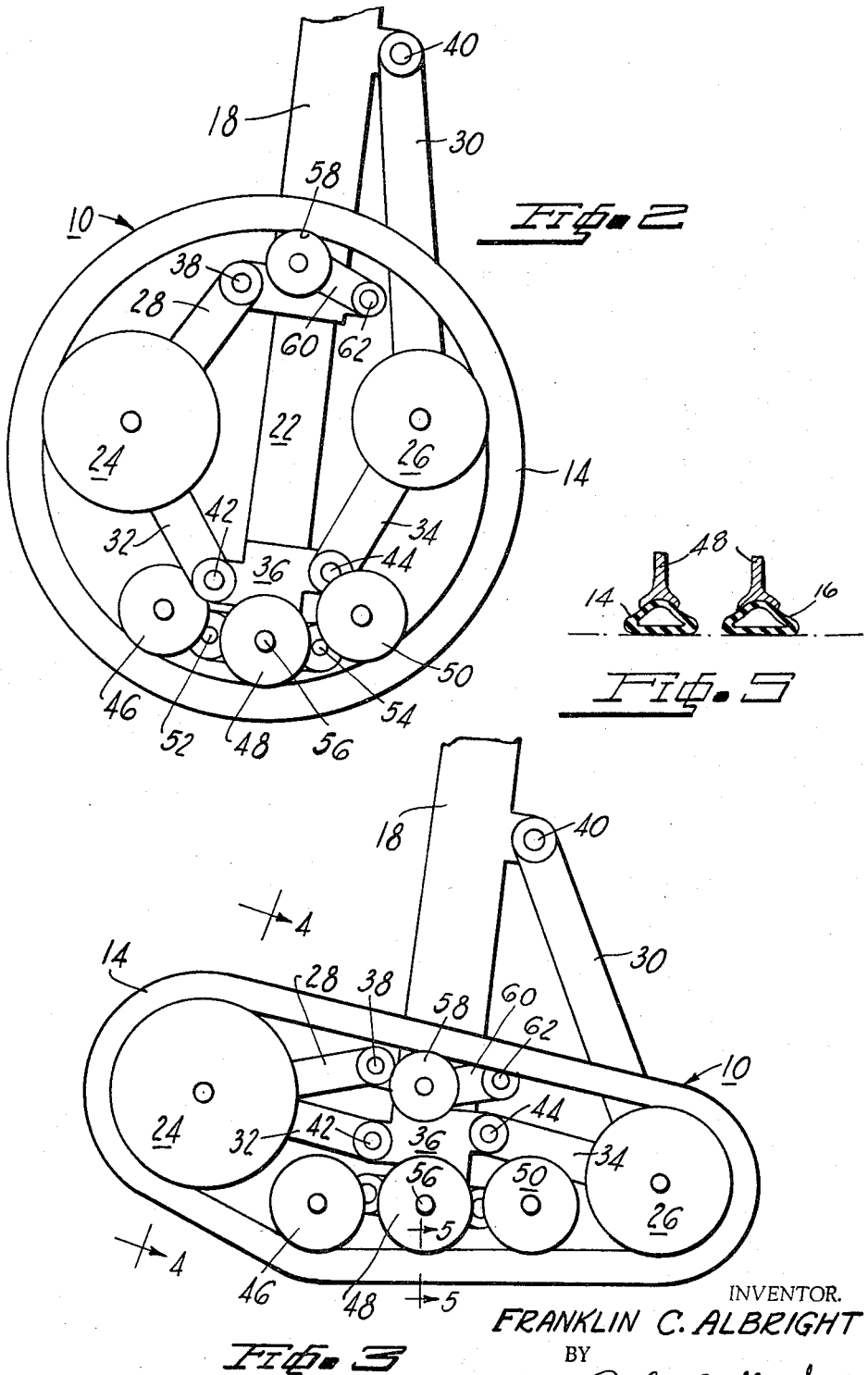

United States Patent Office 3,284,031
Patented Nov. 8, 1966

3,284,031
AIRPLANE LANDING GEAR WITH
ENDLESS TRACK
Franklin C. Albright, South Bend, Ind., assignor to The
Bendix Corporation, South Bend, Ind., a corporation
of Delaware
Filed Sept. 30, 1964, Ser. No. 400,409
5 Claims. (Cl. 244—100)

This invention relates to an airplane landing gear, and more especially it relates to a landing gear of the character wherein endless tracks are substituted for the pneumatic tires, commonly used with landing gear for aircraft.

An object of the invention is to distribute load upon the ground more effectively than heretofore, without unnecessarily increasing the size of the landing element. It will be obvious that, where a wheel and tire is used, if it be required to increase substantially the effective contact area on the ground, a very great increase of wheel-volume is required, with consequent increase in weight and difficulty of storage if retraction be required. Thus, it is a more particular object of this invention to overcome this difficulty by enabling an endless-track landing element to be used.

Although there have been numerous prior proposals for employing endless-track treads as landing elements, such arrangements have not previously been usefully adopted in any general sense. Among the previous proposals, there have been large endless-track units; relatively small units generally taking the form of auxiliary wheels provided fore and aft of a main landing wheel and having an endless band passed around the collective wheel assembly; while, finally, there have been proposals embodying again a large assembly in the form of a bogie around each lateral set of wheels of which an endless band was optionally provided. The very nature of these previous proposals leads one to believe that they were mainly intended as expedience to operate in unfavorable circumstances rather than serious attempts to provide satisfactory landing gear embodying endless track for general use. In any event, the previously proposed arrangements are ill-adapted and therefore unsatisfactory for use with modern aircraft in which aerodynamic drag and unnecessary weight is to be avoided. It is therefore another object of this invention to provide an endless track landing gear which can be readily retracted and which employs a minimum of structure.

It is still a further object of my invention to vary ground drag of an endless track landing gear element by providing a weight sensitive variable profile track type landing gear.

It is a further object of my invention to provide a track type landing gear of the aforedescribed character embodying an elastic track means and self-contained shock absorbing means in a cooperative arrangement.

Other objects and advantages will appear from the following description of the drawings in which:

FIGURE 2 shows a side view of the landing gear of the aforesaid type in the profile it will assume upon the relief of loads thereon or prior to the full settling of an aircraft on the ground;

FIGURE 3 is a side view of the landing gear designed in accordance with the principles of my invention showing its profile in the load supporting condition;

FIGURE 5 is a sectional view taken along lines 5—5 of FIGURE 3.

The concept of employing a track gear on aircraft, with the potential advantages of use on unprepared fields of low bearing strength, has intrigued designers for many years. Probably the earliest concept to be produced was on a Loire-Goudron-Leseure model plane produced by Lewis Venay and designed by an enginner named Cheorau in 1927. Several attempts have been made by others between this date and 1942 when a set of main track gears was installed on an airplane in the United States. While the war stopped this development, subsequent post-war testing sparked considerable interest towards carrying on comprehensive programs of design, fabrication and testing on other aircraft. At first, the development seemed to center around the use of flat built tracks and thereafter proposals for pneumatic track development were tried. In fact, a tire was developed and known as the 47 x 10 x 3 multiple tube pneumatic track tire having an inside diameter of 47" with a width of 10" and the section height being 3". This tire, on which the bogie operated, consisted of a wire belt covered with fabric and rubber. Four endless, cord-reinforced tubular chambers were spaced evenly across the 10" width of the belt. A tread formed the outer circumference. There were early failures in this attempt because of small leaks causing the tread to slip off and in one case caused a blowout. The blowout culminated in a tension failure of the belt ply causing disintegration of the tire and allowing the bogie wheels to land on the underlying surface. However, improvements in materials, new elastomers and compounding techniques, and improved assembly methods now make these failures less likely to happen. Furthermore, as friction forces in spin-up are substantially reduced by having a circular profile, I have lessened this problem even if old tracks were used.

It is my belief that the rack gear 10 employed with the aircraft 12 and embodying on each gear, at least two endless type, tubular tires 14 and 16 operatively connected to shock struts 18 and 20 on each side of the aircraft by means hereinafter desccribed, provide a feasible solution to the problem of how best to support the load of a heavy vehicle on rough and unprepared terrain.

Figure 6:
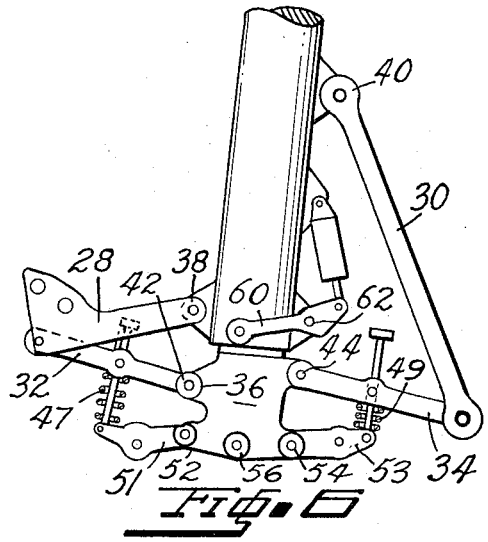
FIGURE 6 is a view similar to that of FIGURE 3 with the rollers and belt removed.

As seen in FIGURES 2, 3 and 6, the tubular track 14 is supported on the shock strut 18 by a lower telescoping leg 22 by means of a front end track bearing roller 24 and a rear-end track bearing roller 26 pivotally connected by links 28 and 30, respectively, to the shock strut 18 and by links 32 and 34 to the telescoping leg 22 as by a lower collar 36 thereon. As seen, the links 28 and 30 are joined by pivot pin connections 38 and 40 to the shock strut 18, and the links 32 and 34 by similar pivot pin connections 42 and 44 to the collar 36. As seen, I have also provided a plurality of loading rollers 46 and 50 pivotally linked via bell cranks 51 and 53 to the collar 36, by pivot pins 52 and 54, respectively. Roller 48 is suitably connected to the axle 56 extending from collar 36. Immediately thereabove I have provided a similar loading roller 58 mounted to the shock strut 18 by means of a bell crank 60 and a pivot pin 62. Rollers 46, 50 and 58 are maintained in the proper position by springs 47, 49 and 55, respectively. These springs may be of any suitable type, such as mechanical, air or hydraulic.

Figure 1:
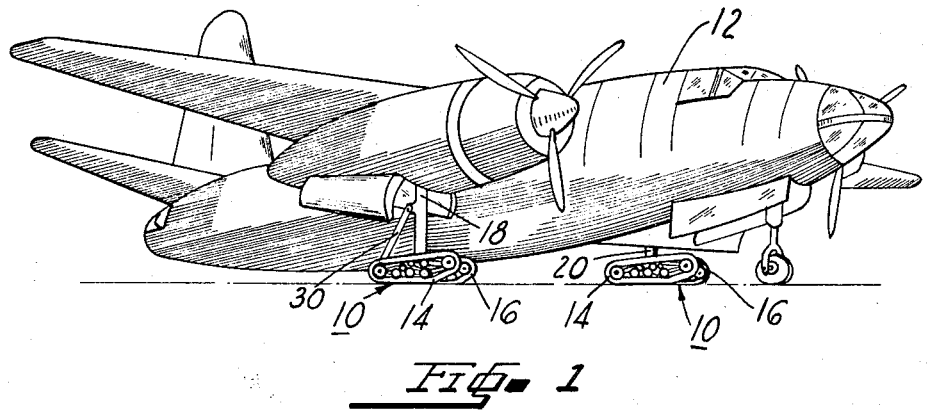
FIGURE 1 shows an aircraft in rest position employing an endless track type landing gear in accordance with the principles of my invention.
Figure 4:
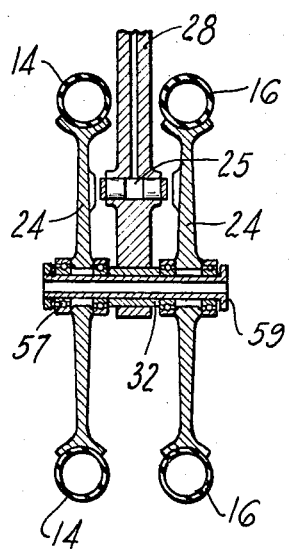
FIGURE 4 is a sectional view taken along lines 4—4 of FIGURE 3.

In addition, the front bearing rollers 24 and similarly the rear bearing rollers 26 are mounted to the respective links by means of roller bearings 57 and an axle 59 passing through the rollers 24 and the pivotal connection between the links 28 and 32, as seen in FIGURE 4.

The arrangement of the bogies or endless track landing gear is such that in the no-load condition, they permit the tread to contract to the true circular form, as seen in FIGURE 2, and as urged by extension of leg 22. If desired, the front bearing roller 24 may incorporate a break 25 having hydraulic pistons 27 and lining 29 of familiar type, and as the contact of the tubes 14 and 16 on this brake adapted roller is very small on spin-up, any drag created by the braking apparatus will be but a small drag force on the tubes 14 and 16 so that the tubes may spin freely upon initial contact with the terrain. This means that with a tread incorporated on the outside of the tubes, that proper wearing and friction characteristics may be provided in such an arrangement similar to that expected of the more familiar wheel type of undercarriage for an aircraft.

The three lower support rollers 46, 48 and 50 are so located that as the load builds up on them, it forces the structure to assume the shape of a conventional track gear. At the same time, the tubes 14 and 16 are being stretched and thereby reduce the vertical landing g's. In addition, as the telescoping member 22 is likewise moving internally of the shock strut 18, and as it is intended that a fluid energy dissipative means be incorporated with such movement, further absorption of the aforementioned loads will provide more than adequate reduction for the rate of vertical dissent of the associated aircraft.

In operation, as an aircraft is approaching the ground the bogie landing gear will be in the circular configuration, as shown by FIGURE 2. Upon initial ground contact, the tubes 14 and 16 are immediately rotated by the contact and as the tubes are stretched and the energy is dissipated by the telescoping relationship of the member 22 within the shock strut 18, the profile of the bogie landing gear 10 is changed to that of FIGURE 3 when the aircraft weight is supported by a wide track surface. Likewise, upon take-off as acceleration of the aircraft increases, the profile of the landing gear 10 approaches the circular form of FIGURE 2 to progressively decrease the drag of ground contact and thereby allow shorter take-off runs than heretofore expected of aircraft employing such landing gear for operation on rough or unimproved terrain.

It is quite apparent that I have accomplished the aforesaid objects of my invention by decreasing the weight necessary for a landing gear of the type above-described, while maintaining an ability thereto to absorb sharp bumps and by suggesting a variable profile therefor. I have also provided a minimum drag type landing gear which can be easily rotated and stored in a minimum of space. Furthermore, as other objects and advantages of my invention are also apparent to those skilled in the art to which the invention relates, I do not wish to be limited by the forgoing description. Instead it is my belief that the true scope of my invention is found in the appended claims.

I claim:

1. An endless track type wheel operatively connected to a support member, said wheel comprising:
   a pair of elastic tubular tracks;
   a pair of front bearing rollers individually associated with said tracks;
   a pair of rear bearing rollers individually associated with said tracks;
   a shock absorbing mechanism operatively connected to said support member and normally biased to an extended attitude;
   a plurality of load rollers one of which is pivotally connected to said support member by a bell crank to which it is revolvably mounted with some other load rollers being revolvably and pivotally supported to said shock absorbing mechanism by other bell cranks and further having one load roller, at least, revolvably fixed to the lower extremity of said shock absorbing mechanism, with all of said rollers operatively connected to said tubular tracks intermediate of said front and rear bearing rollers; and
   lever means to pivotally affix said front and rear rollers to said support member and said shock absorbing mechanism so as to maintain said tubular tracks in a circular profile so long as said shock absorber mechanism is extended.

2. An endless track type wheel according to claim 1 and further comprising a brake means on said front bearin rollers.

3. An endless track type wheel operatively connected to a support member, said wheel comprising:
   a tubular track;
   a front bearing roller adapted to revolvably carry said tubular track;
   a rear bearing roller adapted to revolvably carry said tubular track;
   a shock absorbing mechanism operatively connected to said support member and normally biased downwardly thereof to an extended position;
   a plurality of load rollers operatively connected to said shock absorbing mechanism at the lower extremity thereof and adapted to revolvably carry said tubular track;
   an idler roller pivotally connected to said support member and adapted to revolvably carry said endless track above said shock absorbing mechanism; and
   lever means to pivotally affix said front and rear rollers to said support member and said shock absorbing mechanism to enclose said load rollers and said idler roller so as to maintain said tubular tracks in a circular profile so long as said shock absorber mechanism is extended which profile may be elongated as said shock absorber mechanism is collapsed.

4. An endless track type wheel according to claim 3 and further comprising a brake means on said front bearing rollers.

5. An endless track type gear for an aircraft supported by a shock strut, said landing gear comprising:
   a fluid filled tubular track means;
   a front and rear bearing roller means revolvably connected by a first bell crank to said shock strut and adapted to have said elastic tubular track stretch thereover;
   a shock absorbing mechanism normally biased to depend from said shock strut means and operatively arranged to telescope within said shock strut means;
   a second bell crank means operatively connecting said front and rear bearing roller means to said shock absorbing means;
   a plurality of load roller means having one roller pivotally and revolvably arranged between said front and rear bearing rollers and connected to said shock strut with the remaining load rollers operatively connected to said shock absorbing means so as to stretch said endless elastic tubular track means into a circular profile until the weight of said aircraft has telescoped the shock absorbing means within said shock strut to elongate said elastic tubular track means.

References Cited by the Examiner

UNITED STATES PATENTS

| | | | |
|---|---|---|---|
| 2,416,183 | 2/1947 | Kraft | 305—22 X |
| 2,544,985 | 3/1951 | Drakeley | 244—100 X |
| 2,560,030 | 7/1951 | Allen | 305—22 |
| 2,645,437 | 7/1953 | Bonmartini | 244—103 |

FOREIGN PATENTS 315,581   3/1934   Italy.

BENJAMIN HERSH, *Primary Examiner.*

R. J. JOHNSON, *Assistant Examiner.*